May 17, 1955

C. B. SMITH ET AL 2,708,556

AIRCRAFT GUST DAMPER

Filed Nov. 23, 1951

Inventors
Charles B. Smith
John Goldsmith
By Leonard F. Welsbind
Attorney

| United States Patent Office | 2,708,556 |
|---|---|
| | Patented May 17, 1955 |

2,708,556
AIRCRAFT GUST DAMPER

Charles B. Smith, Windsor, and John Goldsmith, Glastonbury, Conn., assignors, by mesne assignments, to Chance Vought Aircraft, Incorporated, a corporation of Delaware Application November 23, 1951, Serial No. 257,716

5 Claims. (Cl. 244—42)

This invention relates to means for damping gusts in aircraft and more particularly to a mechanism for maintaining the lift on an airfoil substantially constant over a range of angles of attack.

It is therefore an object of this invention to provide a mechanism which will automatically maintain the lift on an airfoil constant during sudden variations in relative angle of attack over a given range of such angles.

These and other features of this invention will become readily apparent from the following detailed description of the drawing in which.

When a vertical gust is encountered by an airplane employing a conventional wing for lift, a vertical acceleration usually results. This not only adds to the discomfort of the passengers but also requires that the airplane be built to withstand larger structural loads than would be required for flight in smooth air. The accelerations occur because the lift changes as the angle of attack changes.

The lift of a wing depends on the circulation established around the airfoil. The lift of a conventional wing will increase or decrease until the pressures on the upper and lower surfaces at the trailing edge are equal. This occurs because the air cannot flow around a sharp trailing edge and the rear stagnation point must remain there. If the trailing edge of an airfoil is rounded, a circulation will still be established. The thick boundary layer air near the trailing edge has so little energy that the air cannot overcome the steep pressure gradients around the curve, and it separates. When this separation occurs, the flow behavior is nearly the same as if the trailing edge were sharp.

By providing a screen at the curved trailing edge all or a portion of the boundary layer can be removed by means of suction. The air will then flow all or part way around the curved trailing edge so that the rear stagnation point may exist in a variety of positions. The factors which determine this location are (a) boundary layer thickness on the upper and lower surface, (b) the quantity of suction, and (c) the distribution of this suction. The first factor indicates that the position of the rear stagnation point is a function of the angle of attack, because the boundary layer thickness is a function of this variable. Ordinarily an increase in angle of attack tends to increase the lift. On an airfoil employing the subject invention the rear stagnation point moves toward the top of the rounded trailing edge when the angle of attack increases because of the increased boundary layer thickness on the upper surface. This results in a decreased lift. Tests show that if the airflow and valve angle are properly adjusted, the decrease in lift due to motion of the rear stagnation point can be made to nearly balance the increase in lift due to increase in angle of attack. The net effect is little or no change in lift. The magnitude of the lift at which no change occurs can be controlled somewhat by the valve position.

Figure 1:
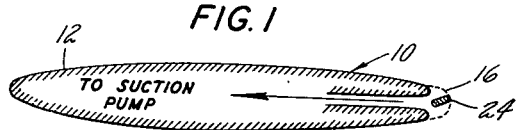
Fig. 1 is a cross-sectional view of an airfoil having the features of this invention.
Figure 2:
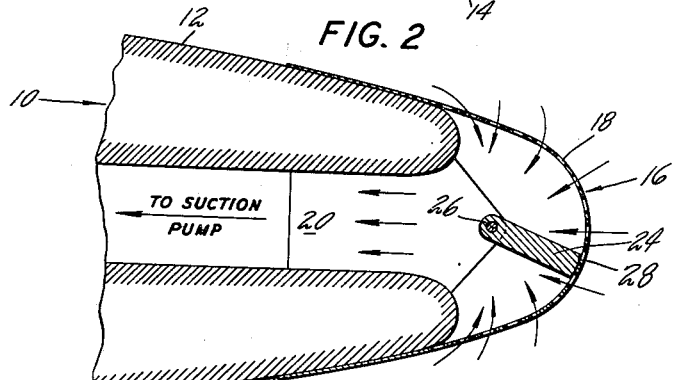
Fig. 2 is a detailed enlarged view of the trailing edge section of Fig. 1.

Referring to Fig. 1, an airfoil 10 is generally illustrated as having an upper surface 12, a lower surface 14 and a rounded trailing edge 16. The trailing edge 16 is perforated to include a number of openings 18 better seen in Fig. 2. These openings or perforations permit the induction of boundary layer flow within the trailing edge and the duct 20 and thence to a suction pump. An adjustable valve member or flap 24 is pivoted to fixed structure at 26 and can be positioned so that its free end 28 is in sealing engagement with the trailing edge 16. Thus by positioning the valve member 24 the relative amount of air inducted within the duct 20 from each of the major surfaces can be regulated to produce the desired effects over a range of angle of attack variation. As pointed out above, the adjustment of the relative amount of flow from either the upper surface 12 or the lower surface 14 of the airfoil can be adjusted so as to obtain the desired motion of the rear stagnation point so that the decrease in lift, for example, due to this movement of the stagnation point can be made to balance the increase in lift due to an increase in angle of attack.

Figure 3:
Fig. 3 is a diagrammatic and partially schematic illustration of the response of this invention to variations of relative angle of attack.

This is best illustrated in Fig. 3 where a number of test runs are illustrated over a range of angles of attack. With the valve member 24 properly adjusted with a given angle relative to the chordwise axis of the airfoil the variation of lift coefficient with variation of angle of attack is considerably different than a conventional airfoil as illustrated in this figure. It will be noted that a conventional airfoil has a lift coefficient curve which rises substantially at 45° with increase of angle of attack. The remaining curves in this figure illustrate what various lift coefficients are obtained over a range of angles of attack for different positions of the valve relative to the chordwise axis of the airfoil, i. e., in a plus or minus direction therefrom. A downward deflection of the valve corresponds to a plus angle on the plots of Fig. 3. It will be noted that in this figure a stagnation point for the low angles of attack is near the bottom surface of the airfoil at a point 32 while in the higher angles of attack the stagnation point moves to a point 34, as illustrated.

Hence, by regulating the suction to a predetermined amount and then positioning the valve member 24 to regulate the relative amount of flow which will be inducted from each of the major surfaces, a particularly desired lift coefficient curve can be obtained over a range of angles of attack. That is, lift coefficient can be maintained substantially constant with changes of angle of attack and thus damp bumps in the aircraft.

Figure 4:
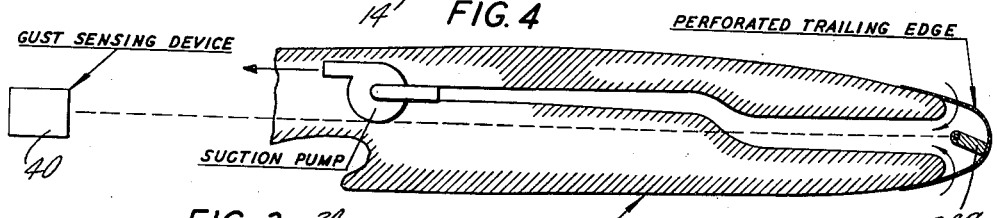
Fig. 4 is a partial cross-sectional illustration of a modified version of the structure including schematically illustrated elements.
Figure 5:
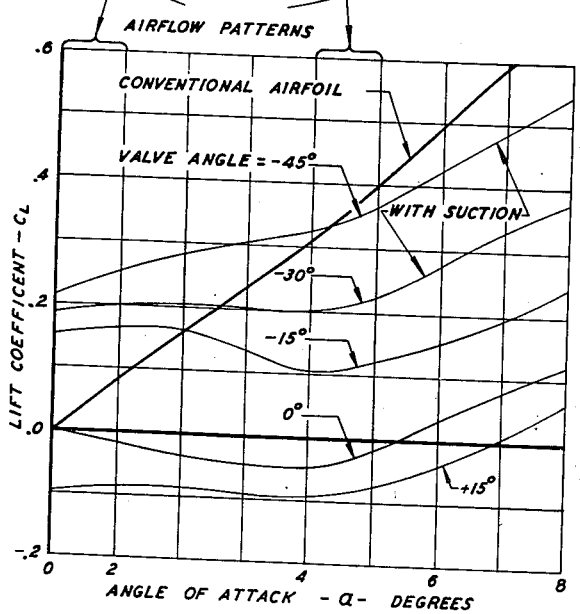
Fig. 5 is an enlarged detail illustration of the mechanism that will be utilized with the Fig. 4 modification.
Figure 5:
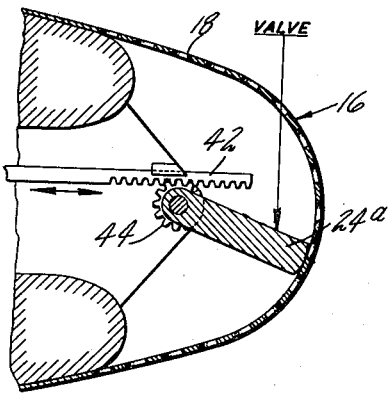

As was previously mentioned, the amount of suction being applied also varies the particular response in regard to lift coefficient. Hence, in order to obtain somewhat different response it may be desirable to have a gust sensing device, as for example as illustrated in Fig. 4, to vary the capacity of the suction pump. However, since varying the suction capacity will not always produce the immediate response in the general circulation about the airfoil, it is more desirable to adjust the position of the valve 24a illustrated in Fig. 4. In this figure a gust sensing device 40 would be located somewhere in the aircraft forward of the airfoil and at some predetermined position relative thereto. The sensing device 40 would be capable of detecting sudden changes in the relative angle of attack of the oncoming airstream and would be operatively connected to the valve member 24a by means for example of a rack 42 and a pinion 44 as illustrated in Fig. 5. The pinion 44 would in turn be fixed to the valve member 24a so that the valve 24a could be adjusted sufficiently to induce motion to the stagnation point on the trailing edge of the airfoil thereby varying the lift.

The sensing device 40 may be any of the types described in the article entitled "The measurement of angle of attack and angle of yaw in flight" starting on page 23 of the Technical Data Digest, November 1950 (vol. 15, No. 11) published by the Central Air Documents Office, Wright-Patterson Air Force Base, Dayton, Ohio. This article indicates that items described therein are disclosed in U. S. Patent Nos. 2,463,585 and 2,513,390. The device 40 may also be of the type described in U. S. Patent No. 2,536,850.

As a result of this invention a simple but highly responsive and automatic adjustment is provided of the circulation about the airfoil so that variations in angle of attack of the relative air will not keep any appreciable variation in lift. As a result vertical acceleration of the aircraft is reduced when any vertical gusts are encountered. Furthermore, by maintaining the lift substantially constant the aircraft structure will not be subject to violent stresses so that lighter structure can be utilized while the comfort of occupants of the aircraft is substantially enhanced. Furthermore, in military aircraft the citing of targets in rough air would much easier.

Although certain embodiments of this invention have been illustrated and described herein it will be apparent that various changes and modifications may be made in the construction and arrangement of the various parts without departing from the scope of this novel concept.

What it is desired to obtain by Letters Patent is:

1. In a lift control device for an airfoil, the airfoil having upper and lower surfaces, a trailing edge fixed to said surfaces and having a curved configuration, a plurality of openings in said trailing edge, means for inducting air through said openings from said surfaces including suction means and a common duct leading to said openings, a flap means in said duct and cooperating with said openings and movable relative to said trailing edge openings to adjust the relative amount of air flow inducted from each of said surfaces, sensing means located upstream of the airfoil and predeterminately positioned relative to the airfoil for detecting variations in relative angle of attack of the oncoming airstream, and means operatively connecting said sensing means and flap means for repositioning the latter in response to variations in the angle of the airstream.

2. In an airfoil, upper and lower surfaces terminating in a trailing edge, said trailing edge comprising a perforate member having an arcuate configuration, the combination of means for automatically maintaining the lift on the airfoil constant over a range of angles of attack comprising means for inducting flow through said perforate member from said upper and lower surfaces, and means for adjusting the relative amount of flow being inducted from each of said surfaces including a pivoted wall whose free end is located adjacent said perforate member and is adjustable through an arc in a vertical plane which arc coincides with the configuration of said perforate member.

3. In a lift control device for an airfoil, the airfoil having upper and lower surfaces, a trailing edge fixed to said surfaces and having a curved configuration, a plurality of openings in said trailing edge, means for inducting air through said openings from said surfaces, and valve means including a member cooperating with said openings and movable relative to said openings through a range for simultaneously increasing the amount of air inducted from one of said surfaces while decreasing the amount of air inducted from the other of said surfaces.

4. In a lift control device for an airfoil, the airfoil having upper and lower surfaces, a trailing edge fixed to said surfaces and having a curved configuration, a plurality of openings in said trailing edge, means for inducting air through said openings from said surfaces, and valve means including a movable member engageable with the inner surface of said trailing edge and movable relative to said openings for simultaneously increasing the amount of air inducted from one of said surfaces while decreasing the amount of air inducted from the other of said surfaces.

5. In a lift control device for an airfoil, the airfoil having upper and lower surfaces, a trailing edge fixed to said surfaces and having a curved configuration, a plurality of openings in said trailing edge, means for inducting air through said openings from said surfaces including suction means and a duct leading to said openings, flap means in said duct and cooperating with said trailing edge openings to adjust the relative amount of air flow inducted from each of said surfaces, said flap means including a member located adjacent said trailing edge and having one end pivoted and the other free end in sealing engagement with said trailing edge, the free end of said member being movable through an arcuate path coinciding with the curved configuration of said trailing edge to vary the induction area on each side of the member, sensing means located upstream of the airfoil and predeterminately positioned relative to the airfoil for detecting variations in the relative angle of attack of the oncoming airstream, and means operatively connecting said sensing means and said member for repositioning the latter in response to variations in the angle of the airstream.

References Cited in the file of this patent

UNITED STATES PATENTS

| | | |
|---|---|---|
| 2,187,446 | Busselmeier | Jan. 6, 1940 |
| 2,282,516 | Gropler et al. | May 12, 1942 |
| 2,302,925 | Von Schlippe | Nov. 24, 1942 |
| 2,568,813 | Lundberg | Sept. 25, 1951 |

FOREIGN PATENTS

| | | |
|---|---|---|
| 610,622 | Great Britain | Oct. 19, 1948 |